United States Patent
Kasevich et al.

(10) Patent No.: US 11,852,485 B2
(45) Date of Patent: *Dec. 26, 2023

(54) INERTIAL NAVIGATION SYSTEM DESIGN FOR PRECISION MOBILE REFERENCE PLATFORMS

(71) Applicant: AOSense, Inc., Sunnyvale, CA (US)

(72) Inventors: Mark A. Kasevich, Palo Alto, CA (US); Matthew Todd Cashen, Gilroy, CA (US); Christopher Jekeli, Columbus, OH (US)

(73) Assignee: AOSense, Inc., Fremont, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/401,645

(22) Filed: Aug. 13, 2021

(65) Prior Publication Data
US 2022/0163331 A1     May 26, 2022

Related U.S. Application Data

(63) Continuation of application No. 15/877,793, filed on Jan. 23, 2018, now Pat. No. 11,150,093.

(60) Provisional application No. 62/450,500, filed on Jan. 25, 2017.

(51) Int. Cl.
    *G01C 21/16*      (2006.01)
    *G01V 7/04*      (2006.01)

(52) U.S. Cl.
    CPC ............. *G01C 21/165* (2013.01); *G01V 7/04* (2013.01)

(58) Field of Classification Search
    CPC .................................................. G01C 21/165
    See application file for complete search history.

(56) References Cited

U.S. PATENT DOCUMENTS

| | | | | |
|---|---|---|---|---|
| 4,982,157 A | * | 1/1991 | Seifert | G01R 33/0358 505/846 |
| 7,324,205 B2 | * | 1/2008 | Howard | G01V 7/00 73/514.27 |
| 3,422,022 A1 | | 4/2013 | Kenneth | |
| 8,422,022 B2 | * | 4/2013 | Salit | H01S 3/0835 356/469 |
| 8,687,198 B2 | | 4/2014 | Salit | |

(Continued)

OTHER PUBLICATIONS

Brandon Anderson, Interferometry with Synthetic Gauge Fields, Condensed Matter Theory Center and Joint Quantum Institute, Department of Physics, University of Maryland, College Park, Maryland 20742-4111, USA (published Mar. 3, 2011) (https://journals.aps.org/pra/pdf/10.1103/PhysRevA.

(Continued)

*Primary Examiner* — Jean Paul Cass
(74) *Attorney, Agent, or Firm* — Van Pelt, Yi & James LLP

(57) ABSTRACT

An inertial navigation system (INS) device includes three or more atomic interferometer inertial sensors, three or more atomic interferometer gravity gradiometers, and a processor. Three or more atomic interferometer inertial sensors obtain raw inertial measurements for three or more components of linear acceleration and three or more components of rotation. Three or more atomic interferometer gravity gradiometers obtain raw measurements for three or more components of the gravity gradient tensor. The processor is configured to determine position using the raw inertial measurements and the raw gravity gradient measurements.

20 Claims, 13 Drawing Sheets

(56) References Cited

U.S. PATENT DOCUMENTS

| | | | |
|---|---|---|---|
| 9,134,450 B2* | 9/2015 | Desruelle | G01V 7/14 |
| 9,291,508 B1 | 3/2016 | Biedermann | |
| 9,554,738 B1 | 1/2017 | Gulati | |
| 9,983,005 B1* | 5/2018 | Biren | G01C 19/64 |
| 10,107,936 B2* | 10/2018 | Compton | G01P 15/093 |
| 10,288,428 B1 | 5/2019 | Cingoz | |
| 10,330,459 B1 | 6/2019 | Matthews | |
| 10,331,087 B2 | 6/2019 | Kotru | |
| 10,571,269 B1 | 2/2020 | Solmeyer | |
| 11,150,093 B1* | 10/2021 | Kasevich | G01V 7/04 |
| 2006/0164648 A1* | 7/2006 | Howard | G01P 15/00 356/450 |
| 2007/0194225 A1 | 8/2007 | Zorn | |
| 2009/0289629 A1 | 11/2009 | Tuchman | |
| 2010/0064767 A1* | 3/2010 | Rice | G01P 15/18 73/1.79 |
| 2010/0153050 A1 | 6/2010 | Zumberge | |
| 2013/0168541 A1 | 7/2013 | Stoner | |
| 2013/0213135 A1 | 8/2013 | Compton | |
| 2014/0022534 A1 | 1/2014 | Strabley | |
| 2014/0113828 A1 | 4/2014 | Gilbert | |
| 2014/0375998 A1* | 12/2014 | Kasevich | G01B 9/02001 356/450 |
| 2016/0163407 A1 | 6/2016 | Kotru | |
| 2016/0216114 A1 | 7/2016 | Kotru | |
| 2016/0298967 A1 | 10/2016 | Johnson | |
| 2017/0356803 A1 | 12/2017 | Bertoldi | |
| 2017/0372808 A1 | 12/2017 | Gill | |
| 2018/0066942 A1* | 3/2018 | Compton | G01C 19/58 |
| 2018/0267479 A1 | 9/2018 | Kotru | |
| 2019/0376790 A1 | 12/2019 | Barrett | |

OTHER PUBLICATIONS

Fang, Metrology with Atom Interferometry: Inertial Sensors from Laboratory to Field Applications, Journal of Physics: Conference Series, 2016 J. Phys.: Conf. Ser. 723 012049 (2016) (https://iopscience.iop.org/article/10.1088/1742-6596/723/1/012049/pdf).

Joint Quantum Institute, A New Design for a Gravimeter, Joint Quantum Institute Room 2207 Atlantic Bldg. University of Maryland at College Park (2010).

Lin et al, Nature, Synthetic magnetic fields for ultracold neutral atoms (https://www.nature.com/articles/nature08609) (Dec. 3, 2009).

Welker et al., Gravity gradiometer integrated inertial navigation, 2013 European Control Conference (ECC), Date of Conference: Jul. 17-19, 2013, Date Added to IEEE Xplore: Dec. 2, 2013 Electronic ISBN: 978-3-033-03962-9 (https://ieeexplore. ieee .org/abstract/document/6669109).

Xiucong Sun, Autonomous orbit determination via kalman filtering of gravity gradients, Publisher: IEEE, EEE Transactions On Aerospace and Electronic Systems vol. 52, No. 5 Oct. 2016 (https://ieeexplore.ieee.org/stamp/stamp.jsp?tp=&arnumber=7812886&tag= 1).

* cited by examiner

INERTIAL NAVIGATION SYSTEM DESIGN FOR PRECISION MOBILE REFERENCE PLATFORMS

CROSS REFERENCE TO OTHER APPLICATIONS

This application is a continuation of U.S. patent application Ser. No. 15/877,793 entitled INERTIAL NAVIGATION SYSTEM DESIGN FOR PRECISION MOBILE REFERENCE PLATFORMS filed Jan. 23, 2018 which is incorporated herein by reference for all purposes, which claims priority to U.S. Provisional Patent Application No. 62/450,500 entitled INERTIAL NAVIGATION SYSTEM DESIGN FOR PRECISION MOBILE REFERENCE PLATFORMS filed Jan. 25, 2017 which is incorporated herein by reference for all purposes.

BACKGROUND OF THE INVENTION

Global Navigation Satellite Systems (GNSS) such as the Global Positioning System (GPS) are now routinely used for many navigation purposes. However, GNSS alone cannot guarantee suitable performance for all scenarios since signals may not be available in the event of jamming or obstructed satellite visibility. Inertial sensors that measure rotation, acceleration, and gravity gradients can be used to navigate autonomously from a known position if GNSS becomes unavailable. However, it is difficult to measure rotation, acceleration, and gravity gradients with the necessary precision in order to maintain acceptable position errors especially over an extended duration as any errors accumulate in a position determination.

BRIEF DESCRIPTION OF THE DRAWINGS

Various embodiments of the invention are disclosed in the following detailed description and the accompanying drawings.

DETAILED DESCRIPTION

Figure 1:
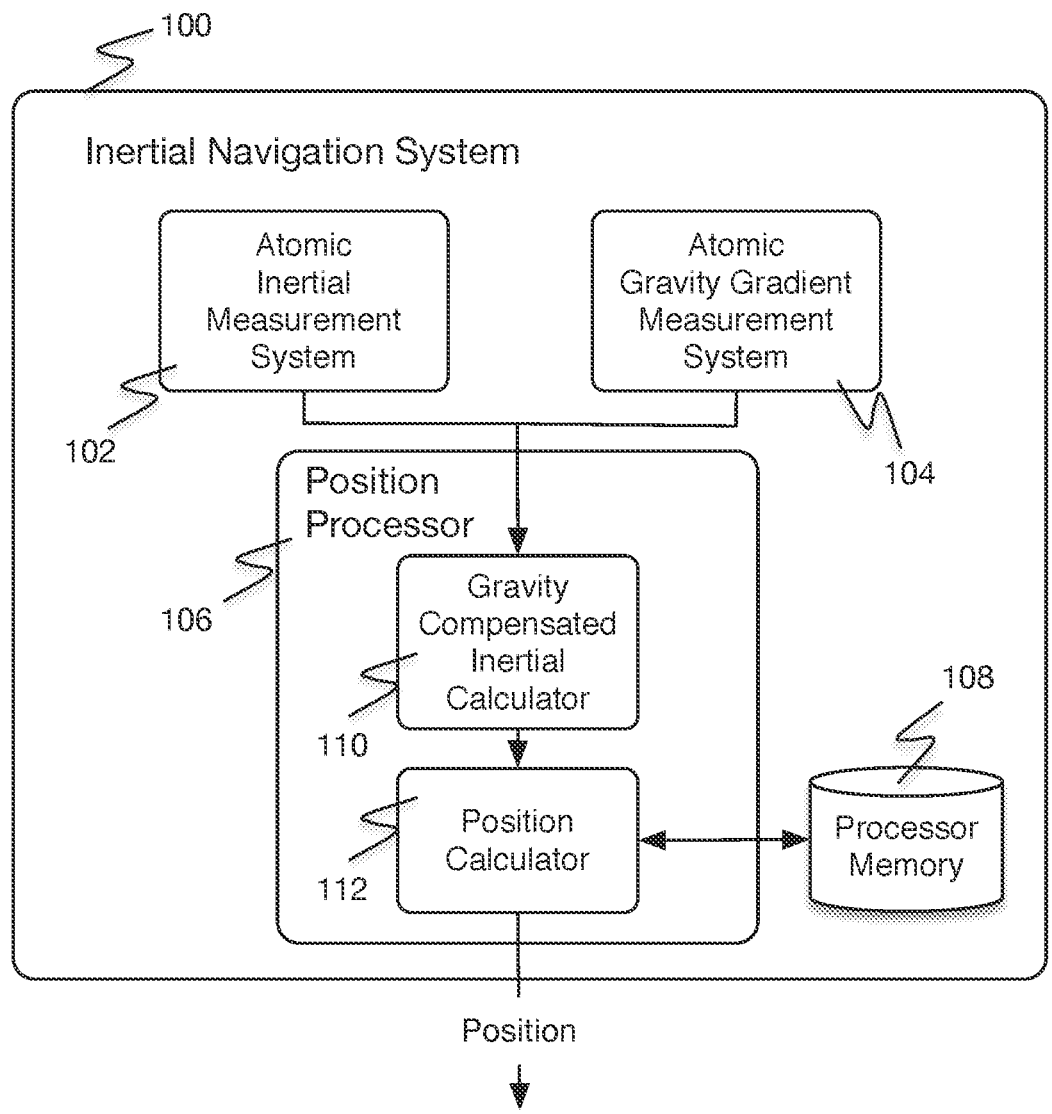
FIG. 1 is a block diagram illustrating an embodiment of an inertial navigation system design for precision mobile reference platforms using atomic interferometers that measure both inertial accelerations and rotations and gravity gradients.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An inertial navigation system is disclosed. The inertial navigation system (INS) comprises three or more atomic interferometer inertial sensors that obtain raw inertial measurements for three or more components of linear acceleration and three or more components of rotation. In addition, the INS comprises three or more atomic interferometer gravity gradiometers that obtain raw measurements for three or more components of the gravity gradient tensor. A processor is configured to determine position using the raw inertial measurements and the raw gravity gradient measurements. In some embodiments, a memory is coupled to the processor and configured to provide the processor with instructions.

The inertial navigation system uses a combination of atomic inertial measurement devices to determine position of a platform. The system comprises atom interferometer accelerometers and atom interferometer gyroscopes which measure along 3 orthogonal axes and an atom interferometer gravity gradiometer which measures horizontal gravity gradients in order to correct for errors induced by unknown gravity changes along the direction of motion of the platform. For example, maintaining acceptable position errors over an extended duration requires exceptional instruments with low noise and low drift rates. If knowledge of position and velocity of primary mobile reference platforms can be determined with sufficient accuracy using high-performance inertial sensors, secondary platforms outfitted with lower-performance sensors can compute their position and velocity by a combination of electromagnetic ranging relative to the primary platforms and absolute position updates sent by the primary platforms. Position and velocity errors of a platform strongly depend on the system design including the number and type of sensors used, sensor mechanization, algorithms, and concepts of operation for deployment and utilization of the system.

Each of the three inertial sensors measures rotation about a single axis and acceleration along a single axis using counter-propagating beams of atoms as a source. Each of the three inertial sensors is arranged with coplanar atomic beam directions, and a 60-degree angle separating any two beams of atoms. In some embodiments, the three inertial sensors are not coplanar and separated at a 60-degree angle. However, the calculations for determining three orthogonal accelerations and rotations are still made but have different calculations performed compared to the coplanar and 60-degree instrument geometry. Each of the three inertial sensors is on a motorized mount that can be used to rotate it about the axis of the atomic beams for calibration and to reduce bias drift by reversing the sense axes. In some embodiments, the three inertial sensors are not on a motorized mount and calibration relies on external motion of the instrument for calibration. The three inertial sensors are aligned with three equivalent symmetry planes of an extruded hexagon in which each symmetry plane is at a 60-degree angle relative to the other symmetry planes, and are arranged symmetrically with respect to the symmetry axis of the extruded hexagon. In some embodiments, the three inertial sensors are aligned with three symmetry planes bisecting the six equal sides of an extruded hexagon, and wherein the three atomic interferometer gravity gradiometers are aligned along three alternate symmetry planes that intersect the vertices of the hexagon. In some embodiments, the geometry of the sensors is neither placed on a hexagon nor is symmetrical in relation to its substrate; this makes alignment more challenging and correspondence to the position calculation determination more challenging but different shapes are possible.

In some embodiments, three inertial sensors are mounted parallel to a base at different heights above the base to allow the beams to be at 60 degrees with respect to each other and not cross each other in the same plane.

In various embodiments, the three inertial sensors are coplanar with a first plane and aligned along a first set of three distinct direction vectors, and wherein the atomic interferometer gravity gradiometer is coplanar with a second plane parallel to the first plane with inline gradient sense axes aligned along a second set of three distinct direction vectors (e.g., a compact hexagonal layout with interleaved accelerometers/gyroscopes and gravity gradiometers). The accelerometers/gyroscopes cross at slightly different heights relative to the mounting baseplate, passing above the gravity gradiometer assembly. This maximizes the length of the accelerometers/gyroscopes, increasing sensitivity. It also facilitates independent rotary mounts for the atomic-beam based accelerometers/gyroscopes.

In some embodiments, gravity gradiometer is mounted on a base with three axes at 60 degrees to each other and three inertial sensors are mounted parallel to the base at different heights above the base to allow the beams to be at 60 degrees with respect to each other and not cross each other and also at different height as the gravity gradiometer.

In some embodiments, three laser beam axes of a gravity gradiometer are 60 degrees apart and are offset 30 degrees from three atomic beam axes of three inertial sensors.

In various embodiments, each inertial sensor comprises a point-source atom interferometer, which can simultaneously provide gyroscope and acceleration outputs.

An INS determines the position and velocity of a vehicle based on inertial sensors and allows fully autonomous navigation. However, the navigation solution is subject to error growth that results from the integration of the sensor errors over time. Performance of inertial measurement units (IMUs) containing accelerometers and gyroscopes can be improved by compensating for the small effects of unknown gravity changes along a trajectory that can adversely impact the determination of local level. Gravity compensation may be accomplished directly or indirectly in several ways. One method that controls error growth regardless of its source corrects the navigation solution with intermittent external position or velocity updates provided by a Global Navigation Satellite Systems (GNSS) such as the Global Positioning System (GPS). A second method matches the environment of the system (such as the terrain, gravity gradient, or magnetic field) that can be sensed in route against an existing stored map, thus indicating errors in the indicated navigation solution. Finally, a third method uses onboard sensed gravity gradients to solve directly for the gravitational effect, but no other errors. The first method is untenable if the external control is not dependable or is corruptible. The second method relies on the correlation between position and the sensed environment, making this type of aiding difficult in slowly varying environments, such as flat terrain or smooth gravity, and dependent on the quality of the existing map, which may be poor in the case of highly volatile magnetic fields. However, a terrain-matching system may be prohibited for covert operations if it is based on active emanating devices such as radar tracking. In contrast, onboard gravity sensors enable navigation in any environment. Gravity gradients are used rather than components of gravity because gravitational acceleration cannot be measured directly by any single sensor whereas gravitational gradients are measureable by pairs of accelerometers on a common platform. A gradiometer-aided INS is a fully autonomous, non-emanating navigation system that, except for initialization, relies strictly on the accuracy of its inertial sensors and the on-board, in situ, gravity compensation.

The INS uses three coplanar inline gravity gradient measurements Txx, Txy, and Tyy from an atomic interferometer. For example, a gradiometer-aided INS relies on gravity compensation by measuring three or more components of the raw gravity gradient tensor Txx, Txy, and Tyy. In the system disclosed, each of the three coplanar inline measurements has a sense axis at an angle of 60 degrees relative to another sense axis. For example, one atomic interferometer sense axis is at a 60-degree angle with respect to a second atomic interferometer sense axis. The atomic interferometer gravity gradiometer includes pairs of atom clouds separated by a distance L measured along a shared interferometer interrogation beam along its sense axis.

In some embodiments, the atomic interferometer gravity gradiometer is aligned with three equivalent symmetry planes of an extruded hexagon in which each symmetry plane is at a 60-degree angle relative to the other symmetry planes, and is arranged symmetrically with respect to the symmetry axis of the extruded hexagon.

In some embodiments, the atomic interferometer gravity gradiometer is aligned with three symmetry planes bisecting the six equal sides of an extruded hexagon, and wherein three inertial sensors are aligned along three alternate symmetry planes that intersect the vertices of the hexagon.

In some embodiments, an inertial navigation system (INS) provides the position and velocity of mobile reference platforms with sufficient accuracy to establish a relative reference frame that may be used for horizontal positioning of secondary platforms operating without GNSS in support of short-term operational requirements. For example, performance requirements have been determined for reference platforms that were assumed to be either a ship or aircraft undergoing relatively benign dynamics and vibration. Performance of the accelerometers and gyroscopes were modeled as a bias offset plus white noise. For gravity compensation, gravity gradiometer measurements were included from either a partial- or full-tensor gradiometer in the model. The overall analysis can be based on error covariance propagation in a Kalman filter algorithm and indicate that the INS gravity compensation requires higher performance of the gravity gradiometer at higher speeds (e.g., speeds corresponding to the operation of an aircraft). The gradiometer requirements may be relaxed in the event that the platform retraces its path repeatedly to revisit the initial calibration point (subject to uncertainty in the position), for example, tracing out a circular or figure-eight path-shape every 15 minutes. Despite possible registration error of the retraced trajectories, this approach substantially reduces error accumulation from gravity anomalies along the trajectories. In the case of a system designed to achieve 5 m position accuracy over a 24 hour duration, periodic retracing of the trajectory reduces the gravity gradient sensitivity required from 1 Eotvos with 1 second updates to 10 Eotvos with 1 second updates.

In some embodiments, a processor is configured to calibrate the INS device by taking measurements for calibration while the INS device has a trajectory that is a closed figure that intersects an initial calibration point within accumulated position errors and retraces a previous path, thereby minimizing build-up of errors due to gravitational uncertainty. For example, repeatedly retracing the same closed path to revisit the initial calibration point (within measurement error) is a useful method to minimize navigation errors due to imperfect modeling and measurement of gravitational anomalies. In some embodiments, a closed path comprises a circle or figure-eight. In some embodiments, a processor is further configured to minimize position error based on a covariance analysis of their errors.

FIG. 1 is a block diagram illustrating an embodiment of an inertial navigation system design for precision mobile reference platforms using atomic interferometers that measure both inertial accelerations and rotations and gravity gradients. In the example shown, inertial navigation systems comprising accelerometers and gyroscopes as well as a system for measuring local gravity gradients allow for high precision mobile reference platforms by compensating for the small effects of otherwise unknown gravity changes along a trajectory. Inertial navigation system 100 makes an inertial measurement and a gravity gradient measurement and sends those measurements to position processor 106, which uses these measurements together with past measurements stored in processor memory 108 to determine the current position of inertial navigation system 100. For example, atomic inertial measurement system 102 is used to determine the current acceleration and rotation of the inertial navigation system 100. Atomic gradient measurement system 104 is used to determine the local gravity gradients. Inertial measurements of acceleration and rotation of atomic inertial measurement system 102 and local gravity gradient measurements by the atomic gradient measurement system 104 are sent to position processor 106. Gravity compensated inertial calculator 110 of position processor 106 determines a correction for the acceleration and rotation measurements made by atomic inertial measurement system 102 using measurements of local gravity gradients from atomic gradient measurement system 104. These corrected inertial measurements are passed to position calculator 112 which computes a precise position by integrating the corrected inertial measurements with one or more stored past measurements. The precise position is then stored in processor memory 108 and provided as output.

Figure 2:
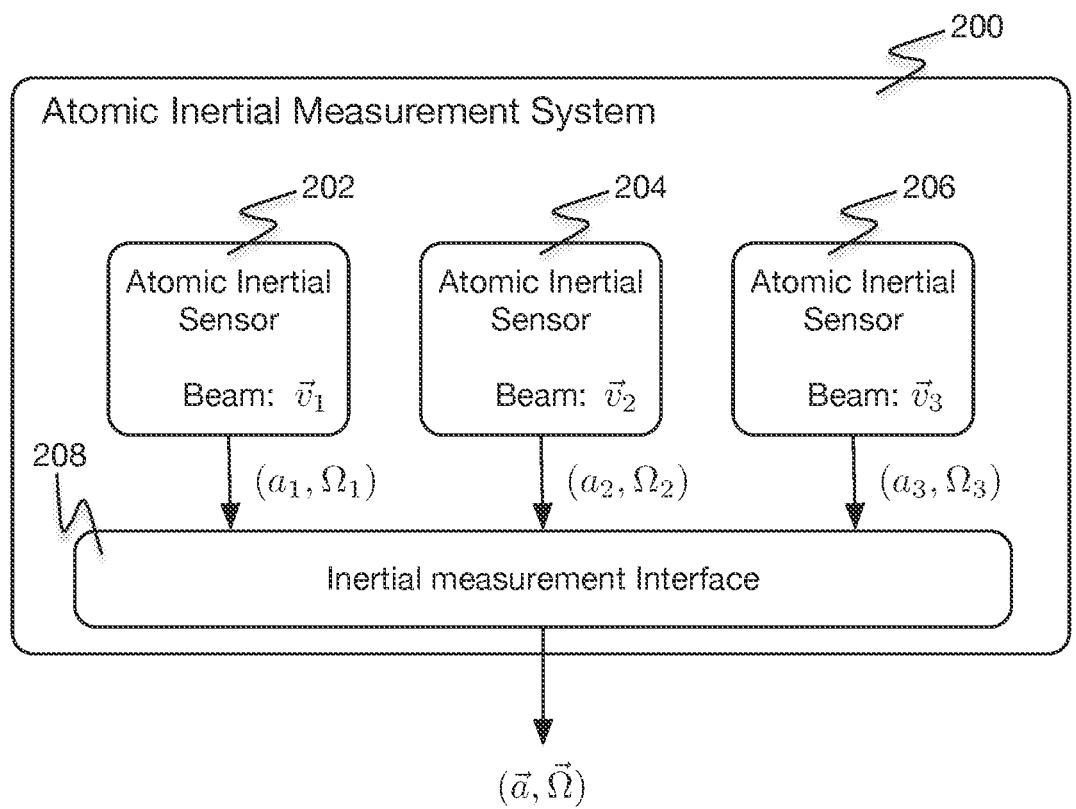
FIG. 2 is a block diagram illustrating an embodiment of an atomic inertial measurement system.

FIG. 2 is a block diagram illustrating an embodiment of an atomic inertial measurement system. In some embodiments, the atomic inertial measurement system 200 is used to implement atomic inertial measurement system 102 of FIG. 1. In the example shown, three atomic inertial sensors (e.g., atomic inertial sensor 202, atomic inertial sensor 204, and atomic inertial sensor 206) are used to sense acceleration and rotation for three beam directions $\vec{v}_1$, $\vec{v}_2$, $\vec{v}_3$, respectively. The acceleration sense axis is determined by the k-vector (e.g., dot product of $\vec{k}$ and $\vec{a}$) and the rotation sense axis is determined by $\vec{k}$ and $\vec{v}$. (e.g., $\vec{k}$ dotted with cross product of $\vec{v}$ and $\vec{\Omega}$). For example, atomic inertial sensor 202 measures acceleration $a_1$ and rotation $\Omega_1$ and sends $a_1$ and $\Omega_1$ to inertial measurement interface 208. Similarly, atomic inertial sensor 204 measures acceleration $a_2$ and rotation $\Omega_2$ and sends $a_2$ and $\Omega_2$ to inertial measurement interface 208. Atomic inertial sensor 206 measures acceleration $a_3$ and rotation $\Omega_3$ and sends $a_3$ and $\Omega_3$ to inertial measurement interface 208. In various embodiments, there may be more than three atomic inertial sensors comprising atomic inertial measurement system 200. For example, access to more than three inertial sensors can provide both noise reduction in the inertial measurement and system robustness in the event of a sensor failure. Inertial measurement interface 208 combines inertial measurements from all inertial sensors and outputs a complete three-dimensional vector for both linear acceleration $\vec{a}$, and rotation $\vec{\Omega}$, of the inertial navigation system 100.

Figure 3:
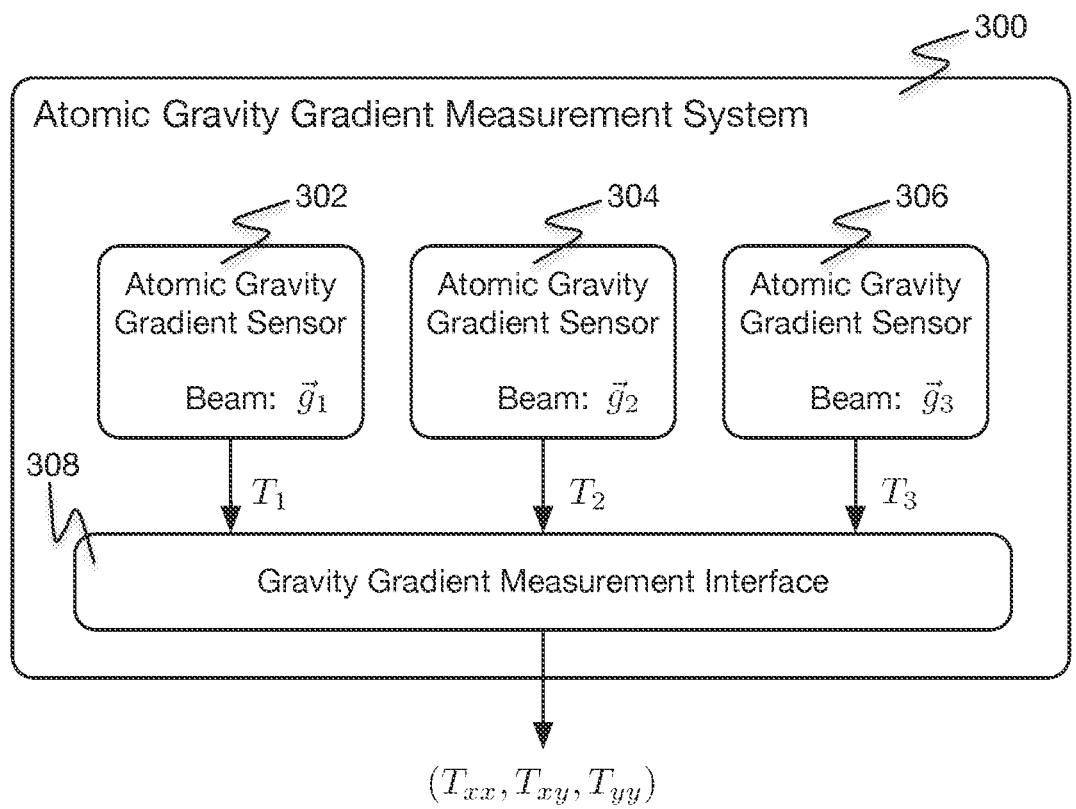
FIG. 3 is a block diagram illustrating an embodiment of an atomic gravity gradient measurement system.

FIG. 3 is a block diagram illustrating an embodiment of an atomic gravity gradient measurement system. In some embodiments, the atomic gravity gradient measurement system 300 is used to implement atomic gravity gradient measurement system 104 of FIG. 1. In the example shown, three atomic gravity gradient sensors (e.g., atomic gravity gradient sensor 302, atomic gravity gradient sensor 304, and atomic gravity gradient sensor 306) are used to sense gravity gradients with respect to three directions $\vec{g}_1$, $\vec{g}_2$, $\vec{g}_3$, respectively. Note that the sense axis is along a Raman laser beam, which defines these axes. For example, atomic gravity gradient sensor 302 measures gravity gradient $T_1$ with respect to direction $\vec{g}_1$ and sends $T_1$ to gravity gradient measurement interface 308. Similarly, atomic gravity gradient sensor 304 measures gravity gradient $T_2$ with respect to direction $\vec{g_2}$ and sends $T_2$ to gravity gradient measurement interface 308. Atomic gravity gradient sensor 306 measures gravity gradient $T_3$ with respect to direction $\vec{g_3}$, and sends $T_3$ to gravity gradient measurement interface 308. In various embodiments, there may be more than three atomic gravity gradient sensors comprising atomic inertial measurement system 300. For example, access to more than three gravity gradient sensors can provide both noise reduction in the gravity gradient measurement and system robustness in the event of a sensor failure. Gravity gradient measurement interface 308 combines gravity gradient measurements from all gravity gradient sensors and outputs a set of gravity gradients $T_{xx}$, $T_{xy}$, and $T_{yy}$.

Figure 4:
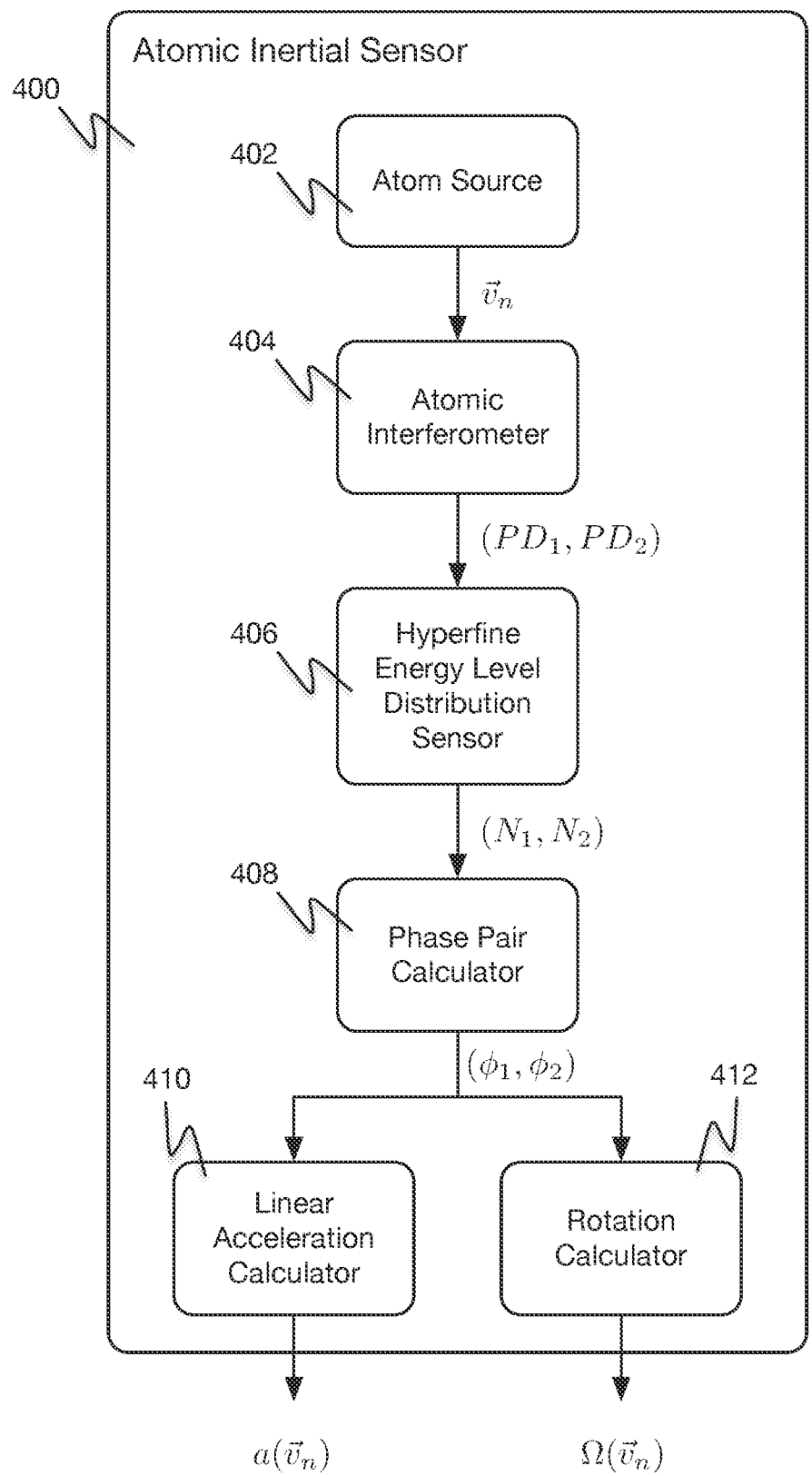
FIG. 4 is a block diagram illustrating an embodiment of an atomic inertial sensor.

FIG. 4 is a block diagram illustrating an embodiment of an atomic inertial sensor. In some embodiments, the atomic inertial sensor 400 is used to implement atomic inertial sensor 202, atomic inertial sensor 204, or atomic inertial sensor 206 of FIG. 2. In the example shown, atomic inertial sensor 400 is used to sense acceleration and rotation with respect to beam direction $\vec{v_n}$. For example, an atomic inertial sensor 400 measures acceleration $a(\vec{v_n})$ with respect to atomic beam direction $\vec{v_n}$ and rotation $\Omega(\vec{v_n})$ with respect to atomic beam direction $\vec{v_n}$ and outputs $a(\vec{v_n})$ and $\Omega(\vec{v_n})$. In some embodiments, outputs $a(\vec{v_n})$ and $\Omega(\vec{v_n})$ are sent to an inertial measurement interface. Atom source 402 with beam direction $\vec{v_n}$ is sent to atomic interferometer 404. In some embodiments, atom source 402 is a thermal beam from an effusive oven. Atom source 402 can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes. In some embodiments, the beam is transversely cooled using laser-cooling techniques. In some embodiments, a two-dimensional magneto-optic trap is used to produce a beam of atoms with lower mean velocity and velocity spread due to the effect of laser cooling. Atomic interferometer 404 is comprised of counter-propagating atomic trajectories and outputs a pair of photodetector signals ($PD_1$, $PD_2$) containing information about the atomic states of the atoms in the interferometer. For example, three or more interferometer laser interactions such as two-photon stimulated Raman transitions are applied to the atoms, and the number of atoms in a particular atomic state after atoms exit the interferometer depends on the rotation or acceleration of the optical platform relative to the inertial trajectory of atoms in vacuum. The number of atoms in a particular state can be measured by a photodetector that detects fluorescence scattered by atoms resonant with one or more detection laser beams. Hyperfine energy level distribution sensor 406 converts the pair of photodetector signals ($PD_1$, $PD_2$) from atomic interferometer 404 into a pair of values ($N_1$, $N_2$) that are proportional to the number of atoms in the hyperfine energy state F4 (e.g., hyperfine energy state of alkali atoms such as cesium, rubidium, etc.) and outputs them to phase pair calculator 408. Phase pair calculator 408 inputs values ($N_1$, $N_2$) from hyperfine energy level distribution sensor 406 and outputs a pair of atomic phases ($\varphi_1$, $\varphi_2$) which are used to calculate linear acceleration and rotation with respect to beam direction $\vec{v_n}$. Linear acceleration calculator 410 inputs a pair of atomic phases ($\varphi_1$, $\varphi_2$) and outputs an estimate of linear acceleration ($\vec{v_n}$). For example, linear acceleration calculator 410 returns an estimate of linear acceleration ($\vec{v_n}$) that is proportional to the sum of the phases ($\varphi_1 + \varphi_2$). Rotation calculator 412 inputs a pair of atomic phases ($\varphi_1$, $\varphi_2$) and outputs an estimate of rotation $\Omega(\vec{v_n})$ with respect to atomic beam direction $\vec{v_n}$. For example, rotation calculator 412 returns an estimate of rotation $\Omega(\vec{v_n})$ that is proportional to the difference of the phases ($\varphi_1 - \varphi_2$).

Figure 5:
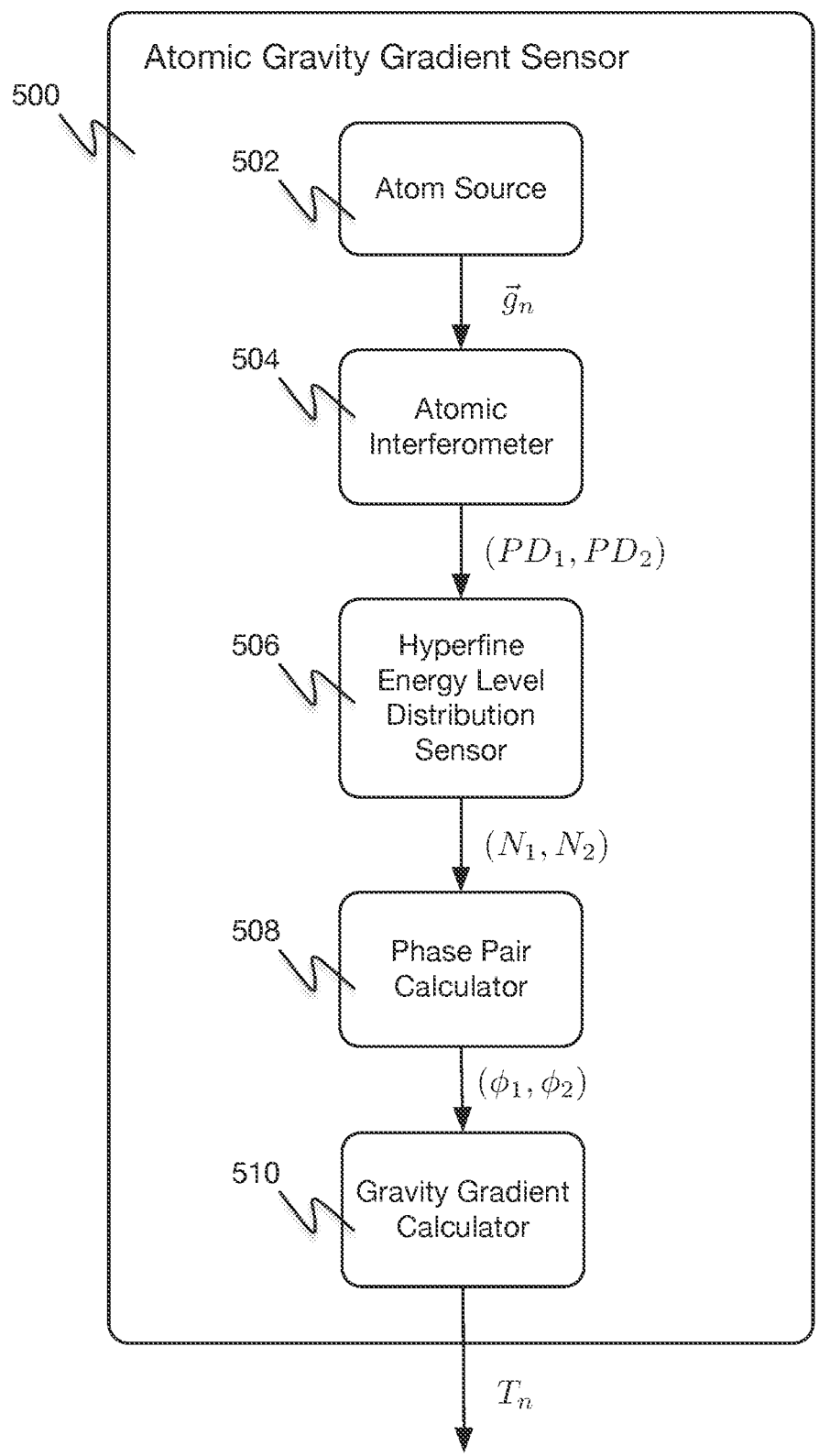
FIG. 5 is a block diagram illustrating an embodiment of an atomic gravity gradient sensor.

FIG. 5 is a block diagram illustrating an embodiment of an atomic gravity gradient sensor. In some embodiments, the atomic gravity gradient sensor 500 is used to implement atomic gravity gradient sensor 302, atomic gravity gradient sensor 304, or atomic gravity gradient sensor 306 of FIG. 3. In the example shown, atomic gravity gradient sensor 500 is used to sense gravity gradients with respect to the direction $\vec{g_n}$. For example, atomic gravity gradient sensor 500 measures gravity gradient $T(\vec{g_n})$ with respect to direction $\vec{g_n}$ and outputs $T(\vec{g_n})$. In some embodiments, output $T(\vec{g_n})$ is sent to a gravity gradient measurement interface. Atom source 502 provides atoms to atomic interferometer 504 which is comprised of two spatially separated atom interferometers configured to sense gravity gradients in the direction $\vec{g_n}$. Atoms are first cooled and trapped from a background vapor or atomic beam source using laser beams creating a sample of laser cooled atoms. For example, the sample can be optically pumped into the F=3, mF=0 sublevel in the case of the Cesium D2 transition and the atoms can be released into free fall to be used for inertial measurement. Atom beam 502 can be produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes. The beam is transversely cooled using laser-cooling techniques. A two-dimensional magneto-optic trap may be used to produce a beam of atoms with lower mean velocity and velocity spread due to the effect of laser cooling. In various embodiments, laser trapped atoms in atom source 502 are produced in a pulsed fashion, laser trapped atoms in atom source 502 are produced continuously, or any appropriate combination of pulsed or continuous production. Atomic interferometer 504 outputs a pair of photodetector signals ($PD_1$, $PD_2$) containing information about the atomic states of the atoms in the interferometer. For example, three or more interferometer laser interactions such as two-photon stimulated Raman transitions are applied to the atoms, and the number of atoms in a particular atomic state after atoms exit the interferometer depends on the gravity gradient over the spatial separation of the atom interferometer device. The number of atoms in a particular state can be measured by a photodetector that detects fluorescence scattered by atoms resonant with one or more detection laser beams. Hyperfine energy level distribution sensor 506 converts the pair of photodetector signals ($PD_1$, $PD_2$) from atomic interferometer 504 into a pair of values ($N_1$, $N_2$) that are proportional to the number of atoms in one of the atom interferometer output states (e.g., hyperfine energy state of alkali atoms such as cesium, rubidium, etc.) and provides them to phase pair calculator 508. Phase pair calculator 508 received as inputs values ($N_1$, $N_2$) from hyperfine energy level distribution sensor 506 and outputs a pair of atomic phases ($\varphi_1$, $\varphi_2$) which are used to calculate gravity gradient with respect to direction $\vec{g}_n$. Gravity gradient calculator 510 has as its inputs a pair of atomic phases ($\varphi_1$, $\varphi_2$) and outputs an estimate of gravity gradient $T(\vec{g}_n)$ from the phase difference (e.g., ($\varphi_1-\varphi_2$).

Figure 6:
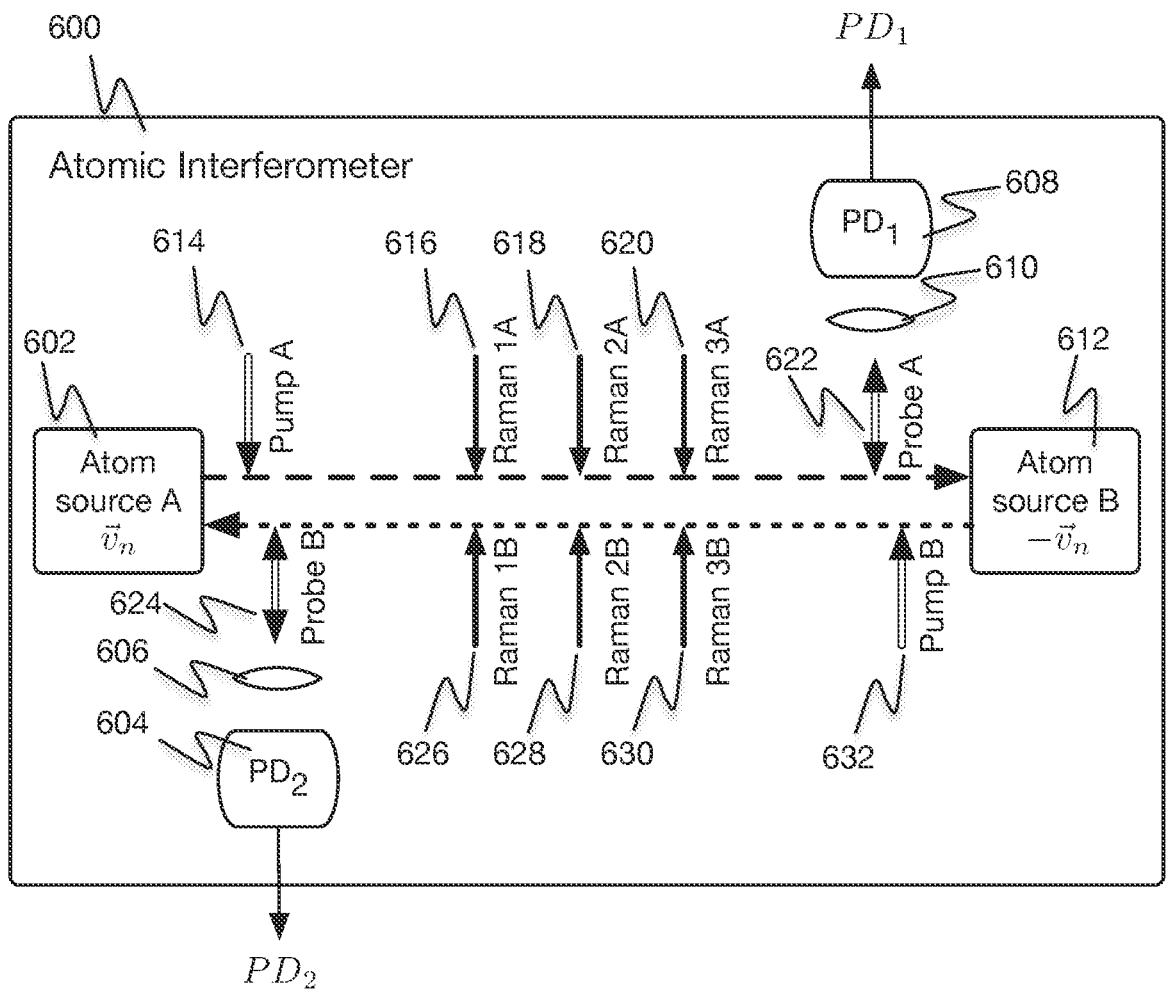
FIG. 6 is a block diagram of an atomic interferometer. In some embodiments, the atomic interferometer 600 is used to implement atomic interferometer 404 of FIG. 4.

FIG. 6 is a block diagram of an atomic interferometer. In some embodiments, the atomic interferometer 600 is used to implement atomic interferometer 404 of FIG. 4. In the example shown, atom source A 602 and atom source B 612 output atomic beams that traverse along the long axis of the sensor. In some embodiments, atom source A 602 and atom source B 612 are produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes. In some embodiments, the beam is transversely cooled using laser-cooling techniques. In some embodiments, a two-dimensional magneto-optic trap is used to produce a beam of atoms with lower mean velocity and velocity spread due to the effect of laser cooling. In various embodiments, laser trapped atoms in atom source A 602 and atom source B 612 are pulsed, laser trapped atoms in atom source A 602 and atom source B 612 are continuous, or any appropriate combination of the two. Pump A 614 and pump B 632 are state preparation beams that put atoms into a desired quantum state, and probe A 622 and probe B 624 are detection beams that measure the number of atoms exiting the interferometer in a particular quantum state. In order to optimize the performance of the atom interferometer, for the case of atomic cesium the atoms are optically pumped into the F=3 hyperfine ground state into the $m_F=0$ magnetic sublevel. The optically pumped atomic beam then enters the atom interferometer which is created using a sequence of three interferometer interrogation beams. The three sets of beams comprise the interferometer interrogation beams. The first set comprises beam 616 and beam 626. The second set comprises beam 618 and beam 628. The third set comprises beam 620 and beam 630. For example, interferometer interrogation beams are two-photon stimulated Raman transitions that are tuned to coherently split into a superposition of states and then recombine the atomic wave packets. At the output of the interferometer one can monitor the atomic population in either the F=3, $m_F=0$ or F=4, $m_F=0$ atomic states, again in the case of atomic cesium, by using a laser probe beam (e.g., probe A 622 or probe B 624) which can be tuned to the F=4, $m_F=0$ resonance to induce fluorescence proportional to the number of atoms in the F=4 state which can then be measured using a photodiode (e.g. $PD_1$ 608 and $PD_2$ 604). The photodiode current is converted to a voltage that can be digitized so that signal processing and filtering techniques can be applied to remove unwanted noise from the signal. Since the atoms entering the interferometer have been pumped into the F=3, $m_F=0$ sublevel the F=4, $m_F=0$ sublevel has nearly zero background and is therefore ideal for interference fringe detection. The number of atoms in the F=4 state at the output of the interferometer can be expressed as $N_4=N/2(1-\cos(\phi))$ where N is the total number of atoms entering the interferometer after being optical pumped into the N=3, $m_F=0$ state. The phase $\phi$ contains the laser phases and inertial sensitivity phase. In some embodiments, additional interactions are applied to increase the momentum transferred to the atoms and increase the interferometer sensitivity due to larger enclosed area. Readout photodiodes $PD_1$ 608 and $PD_2$ 604 using collection optic 610 and collection optic 606, respectively, measure the population of atoms in one or both atomic ground states using a probe laser beam via fluorescence or absorption. The number of atoms in either state is proportional to the fluoresced or absorbed power and the population in either or both states can be measured with one or more laser beams and one or more photodiodes. In various embodiments, the readout from atomic interferometer 600 uses the D2 atomic transition for Cesium, uses the D2 atomic transition for Rubidium, or any other appropriate atomic transition. Atomic interferometer 600 outputs a pair of photodetector signals ($PD_1$, $PD_2$) containing information about the atomic states of the atoms in the interferometer undergoing various inertial conditions.

In the example shown, atomic interferometer 600 may also be based on laser trapped atoms where the atom source is pulsed. Atoms are first cooled and trapped from a background vapor or atomic beam source using laser beams creating a sample of laser cooled atoms. The sample can be optically pumped into the F=3, $m_F=0$ sublevel in the case of the Cesium D2 transition and the atoms can be launched in counter-propagating directions to be used for inertial measurement. An atom interferometer can be created using a sequence of laser pulses from the interferometer interrogation beams (e.g. beam 616, beam 618, beam 620, beam 626, beam 628, and beam 630), which is sensitive to accelerations along the direction of the Raman laser beam. The phase of the atom interferometer is determined by measuring the number of atoms $N_4$ in the F=4, $m_F=0$ state using a pulse of light tuned to the F=4, $m_F=0$ transition and detecting atomic fluorescence using a photodiode. The total number of atoms N is determined using a subsequent pulse of light with spectral components that excite both the F=4 and F=3 states. The arc cosine of the ratio of $N_4/N$ is then used to determine the phase of the atom interferometer and thus any measure any inertial forces during the atomic launch trajectory. Note that the acceleration sense axis is parallel to the Raman laser beams and that the rotation sense axis is out of the page for FIG. 6.

Figure 7:
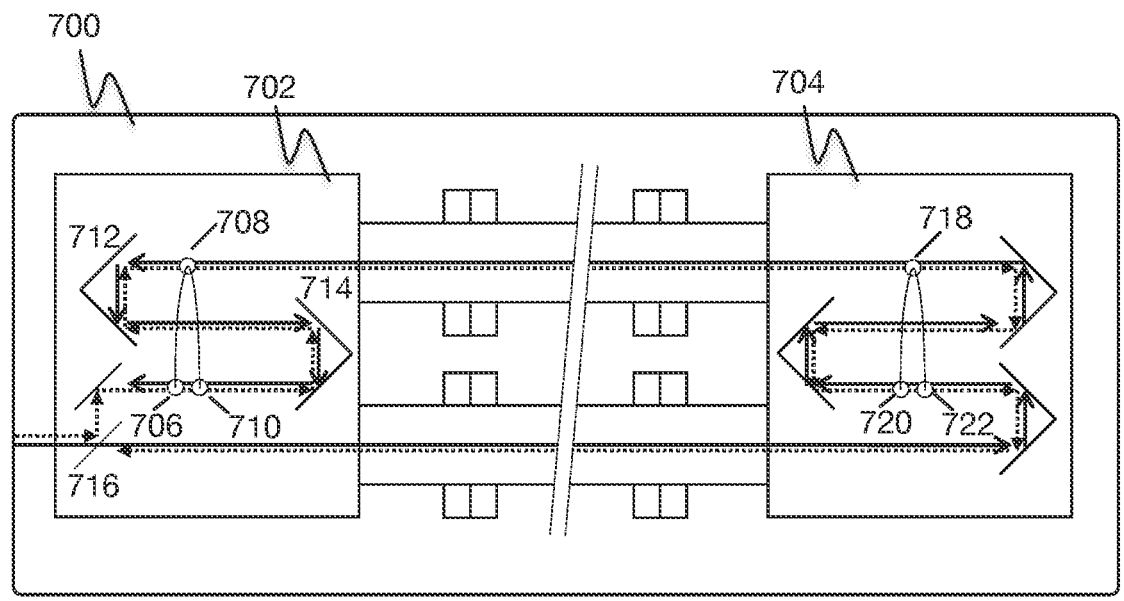
FIG. 7 shows a schematic of a gravity gradiometer used to measure an inline component of the gravity gradient tensor T.

FIG. 7 shows a schematic of a gravity gradiometer used to measure an inline component of the gravity gradient tensor T. In some embodiments, gravity gradiometer 700 is used to implement atomic gravity gradient sensor 302, atomic gravity gradient sensor 304, or atomic gravity gradient sensor 306 of FIG. 3 or atomic gravity gradient sensor 500 of FIG. 5. In the example shown, vacuum cell 702 and vacuum cell 704 each house an atom trap based on laser cooling for producing an ensemble of laser-cooled atoms. The main vacuum cells also include optics to route the interferometer interrogation light. For example, interrogation beams are routed in main vacuum cell 702 and vacuum cell 704. Each pair of vacuum cells has two interconnecting beam tubes (shown truncated with dashed lines due to their length) through which interferometer interrogation light passes to be shared by the two ensembles of cold atoms. Laser light is generated via separate control electronics and may be delivered via one or more fibers or via free-space. The interferometer interrogation light, for example, two-photon stimulated Raman light, comprises two frequencies of light that enters the chamber with crossed polarization and is subsequently separated by a polarization sensitive beam-splitter 716. Interferometer light is routed in a racetrack configuration with the two frequencies traversing in opposite directions utilizing corner cube retro-reflector optics (e.g. retro-reflector 712 and retro-reflector 714) to create parallel beam segments. The retro-reflector optics are drawn as having two surfaces for simplicity but it may be advantageous to use three surfaces in practice to maintain beam parallelism. The ensembles of atoms are indicated by circles (e.g. circle 706, circle 708, and circle 710 in vacuum cell 702 and circle 718, circle 720, and circle 722 in vacuum cell 704), and the trajectory of the atoms is indicated by a parabola. Atoms are interrogated at the bottom of the trajectory shortly after leaving the trap, then a second time near the top of the trajectory, and once again at the bottom of the trajectory. In some embodiments, the atoms are launched vertically, but a horizontal offset is drawn for clarity in indicating the three points of interaction with the interferometer light. In other embodiments, the atoms may be dropped and interrogated in three spatially separate positions. The three interferometer interrogation beams are tuned to coherently split the atoms into a superposition of states and then recombine the atomic wave packets. When the atomic wave packets are recombined, they create an interference pattern that depends on the gravity at both locations of circle 710 and circle 722. The difference in the two interference patterns provides the gradient of gravity along a vector connecting the locations of circle 710 and circle 722.

Figure 8:
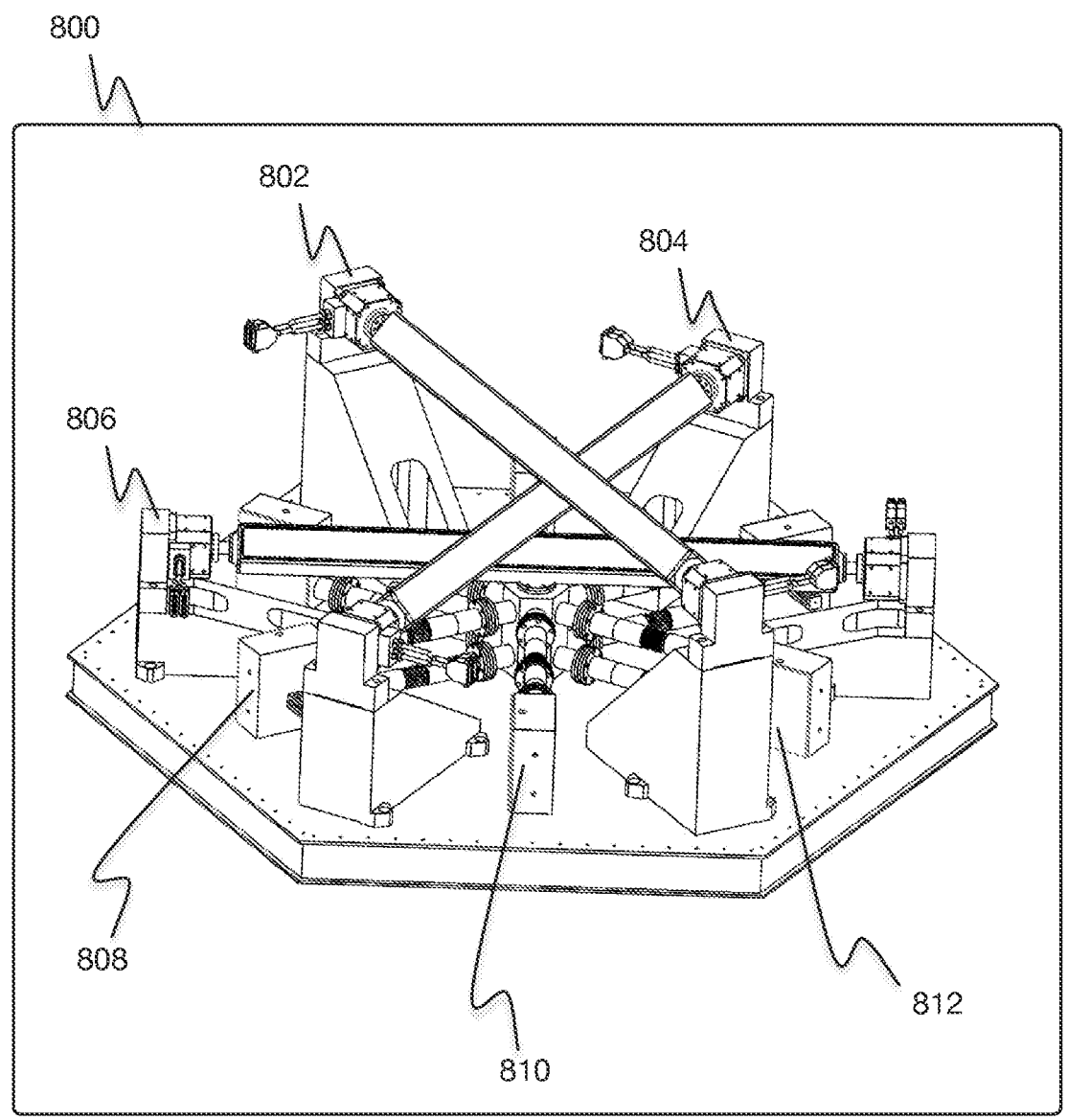
FIG. 8 shows an embodiment of an inertial navigation system in a space-efficient hexagonal configuration, including three accelerometer/gyroscope sensors each based on counter-propagating atomic beams, and a partial-tensor gradiometer that can be used to determine all gravity gradient tensor components in a plane.

FIG. 8 shows an embodiment of an inertial navigation system in a space-efficient hexagonal configuration, including three accelerometer/gyroscope sensors each based on counter-propagating atomic beams, and a partial-tensor gradiometer that can be used to determine all gravity gradient tensor components in a plane. In the example shown, inertial navigation system 800 includes three atomic interferometer accelerometer/gyroscope sensors and three atomic interferometer gravity gradiometers. The accelerometer/gyroscope sensors (e.g., sensor 802, sensor 804, sensor 806) are shown with motorized fixtures at each end such that they can be rotated about the axis of the atomic beams. This facilitates calibration and can be used for case-reversal (i.e., inverting the sense axes of the accelerometer and gyroscope). Comparing the sensor data with and without case-reversal can help to correct for certain systematic effects. The outputs of the gravity gradiometers (e.g., sensor 808, sensor 810, or sensor 812) can be used to compute corrections to local vertical and subtract acceleration components due to gravity anomalies from the total acceleration measured by the accelerometers, resulting in an estimate of the total acceleration due to platform motion. This minimizes the error in the computed position and velocity estimates.

The three inertial sensors are aligned with three equivalent symmetry planes of an extruded hexagon in which each symmetry plane is at a 60-degree angle relative to the other symmetry planes, and are arranged symmetrically with respect to the symmetry axis of the extruded hexagon. In some embodiments, the three inertial sensors are aligned with three symmetry planes bisecting the six equal sides of an extruded hexagon, and wherein the three atomic interferometer gravity gradiometers are aligned along three alternate symmetry planes that intersect the vertices of the hexagon. In some embodiments, the geometry of the sensors is neither placed on a hexagon nor is symmetrical in relation to its substrate; this makes alignment more challenging and correspondence to the position determination more challenging but different shapes are possible. In various embodiments, the three inertial sensors are coplanar with a first plane and aligned along a first set of three distinct direction vectors, and wherein the atomic interferometer gravity gradiometer is coplanar with a second plane parallel to the first plane with inline gradient sense axes aligned along a second set of three distinct direction vectors (e.g., a compact hexagonal layout with interleaved accelerometer/gyroscopes and gravity gradiometers). The accelerometers/gyroscopes cross at slightly different heights relative to the mounting baseplate, passing above the gravity gradiometer beam tubes. This maximizes the length of the accelerometers/gyroscopes, increasing sensitivity. It also facilitates independent rotary mounts for the atomic-beam based accelerometers/gyroscopes. In some embodiments, the atomic interferometer gravity gradiometer is aligned with three equivalent symmetry planes of an extruded hexagon in which each symmetry plane is at a 60-degree angle relative to the other symmetry planes, and is arranged symmetrically with respect to the symmetry axis of the extruded hexagon. In some embodiments, the atomic interferometer gravity gradiometers are aligned with three symmetry planes bisecting the six equal sides of an extruded hexagon, and wherein three inertial sensors are aligned along three alternate symmetry planes that intersect the vertices of the hexagon.

Figure 9:
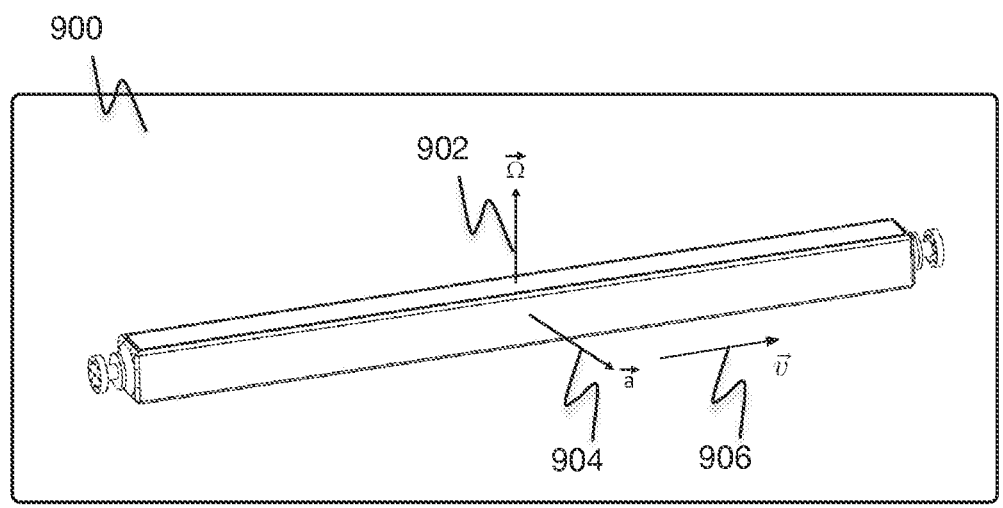
FIG. 9 shows an embodiment of an accelerometer/gyroscope based on counter-propagating atomic beams.

FIG. 9 shows an embodiment of an accelerometer/gyroscope based on counter-propagating atomic beams. In some embodiments, accelerometer/gyroscope 900 is used to implement atomic interferometer accelerometer/gyroscope 802, atomic interferometer accelerometer/gyroscope 804, or atomic interferometer accelerometer/gyroscope 806 of FIG. 8. In the example shown, the atomic beams are produced by heating a source of appropriate atoms to form a vapor. Any atoms with transitions amenable to atomic physics techniques using available lasers may be used; for example, alkali atoms such as cesium, rubidium, etc. The vapor is collimated by a nozzle or array of collimating holes. The beam is transversely cooled using laser-cooling techniques. A two-dimensional magneto-optic trap may be used to produce a beam of atoms with lower mean velocity and velocity spread due to the effect of laser cooling. Three or more interferometer laser pulses such as two-photon stimulated Raman transitions are applied to the atoms, and the number of atoms in a particular atomic state after atoms exit the interferometer depends on the rotation or acceleration of the optical platform relative to the inertial trajectory of atoms in vacuum. The number of atoms in a particular state can be measured by detecting fluorescence scattered by atoms resonant with one or more detection laser beams. Counter-propagating atomic beams are used, since reversing the velocity direction reverses the sign of the Coriolis acceleration, which is proportional to $\vec{\Omega} \times \vec{v}$. Acceleration and rotation signals can then be isolated from each other by adding or subtracting the signals from opposing interferometers. The direction of the sense axis for rotation is shown as vector 902 and the direction of the sense axis for linear acceleration is shown as vector 904. Atom trajectories are in the direction of vector 906 or its opposite along the center line of the enclosure. In some embodiments, point-source atom interferometry may be used for the accelerometers/gyroscopes instead of atomic beams as are shown here. Point-source interferometry uses one or more cameras to image the fringe pattern after laser-cooled balls of atoms expand from a trap that can be approximated as a point-source, then interact with three or more interferometer laser pulses, and are finally illuminated by a detection pulse. Rotation and acceleration can be determined from the spatially imaged fringe pattern.

Figure 10:
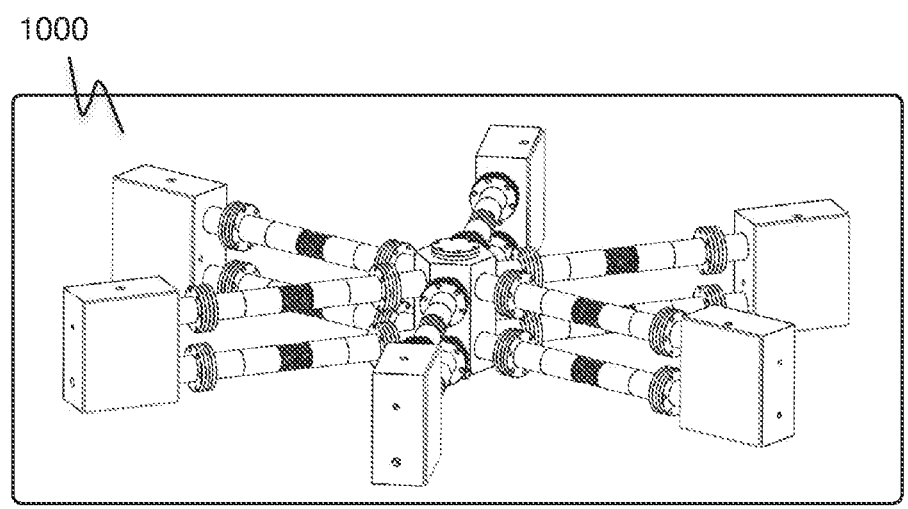
FIG. 10 shows an embodiment of a partial-tensor gradiometer.

FIG. 10 shows an embodiment of a partial-tensor gradiometer. In some embodiments, the three gradiometers shown in 1000 are used to implement atomic interferometer gradient gravimeter 808, atomic interferometer gradient gravimeter 810, or atomic interferometer gradient gravimeter 812 of FIG. 8. In the example shown, interferometer beams are shared between pairs of laser-cooled atom clouds that are launched upward or dropped and allowed to fall under the influence of gravity in different embodiments. Interferometer beams are enclosed in vacuum beam tubes to avoid phase shifts due to air currents or windows. The central feature shown in the image is just one of many possibilities to allow the beam tubes to intersect at the center; another possibility would be welded tubes. Measuring gravity gradients along three independent axes allows calculation of all components of the gravity gradient tensor in the xy-plane perpendicular to gravity: Txx, Txy, and Tyy. Two vertically separated beam tubes are shown along each axis, facilitating a race-track layout that delivers the interferometer beams to the atoms at appropriate locations and in appropriate directions. Other interferometer configurations may also be used, including larger numbers of interferometer pulses to increase interferometer sensitivity due to larger enclosed area.

Figure 11:
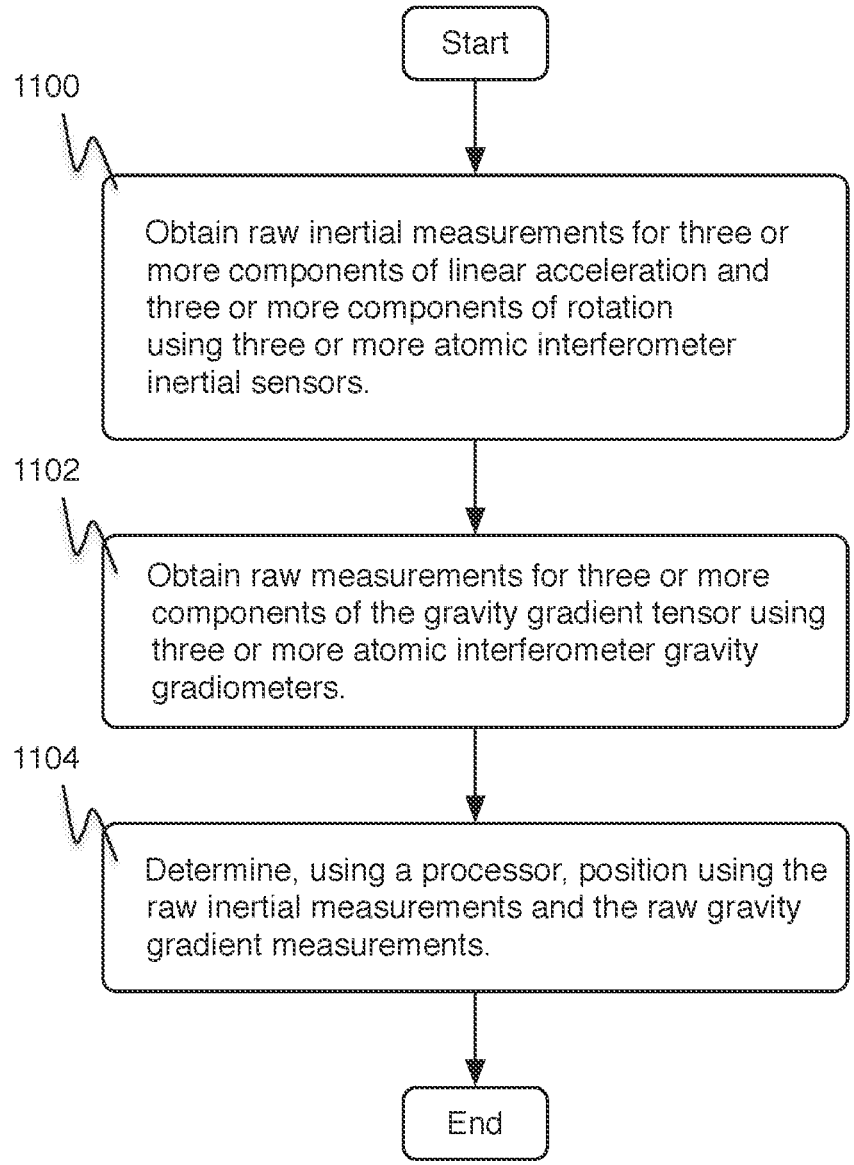
FIG. 11 is a flow diagram illustrating an embodiment of a process for determining a precise position using an inertial navigation system design for precision mobile reference platforms.

FIG. 11 is a flow diagram illustrating an embodiment of a process for determining a precise position using an inertial navigation system design for precision mobile reference platforms. In some embodiments, the process of FIG. 11 is executed using inertial navigation system 100 of FIG. 1. In the example shown, in 1100, raw inertial measurements for three or more components of linear acceleration and three or more components of rotation using three or more atomic interferometer inertial sensors are obtained. For example, three atomic interferometers are mounted in planes parallel to each other with 60 degrees offsets in their directions. These three atomic interferometers are used to measure acceleration and rotation for the three orthogonal directions x, y, and z and rotations about the x, y, and z axes. These accelerations and rotations are used to determine a position of the system by integrating over the history of inertial changes. Accelerations are integrated once in time to obtain platform velocity and again in time to obtain position. Rotations are used to orient the integrations in the navigation coordinate frame. In 1102, raw measurements for three or more components of the gravity gradient tensor using three or more atomic interferometer gravity gradiometers are obtained. For example, three atomic interferometer gravity gradiometers mounted with axes 60 degrees apart are used to measure Txx, Txy, and Tyy components of the gravity gradient tensor. In 1104, precise position using the raw inertial measurements and the raw gravity gradient measurements are determined using a processor. Inertial measurement units alone do not sense the effect of gravity on a platform, but the vehicle is subject to both inertial acceleration and gravity. The gravity gradient measurements are used to include gravity effects in refining the position calculation. For a moving platform, the error in the calculated position of the platform will grow with time if the difference in the gravity field between subsequent platform locations is not measured and corrected for. The inclusion of measurements from a gravity gradiometer allow for the removal of gravitational difference errors in the platform position calculation by integration of the gravity gradient over the direction of motion of the platform. This constrains the growth of the error in the position calculation that would otherwise arise from gravity not being properly accounted for.

Figure 12:
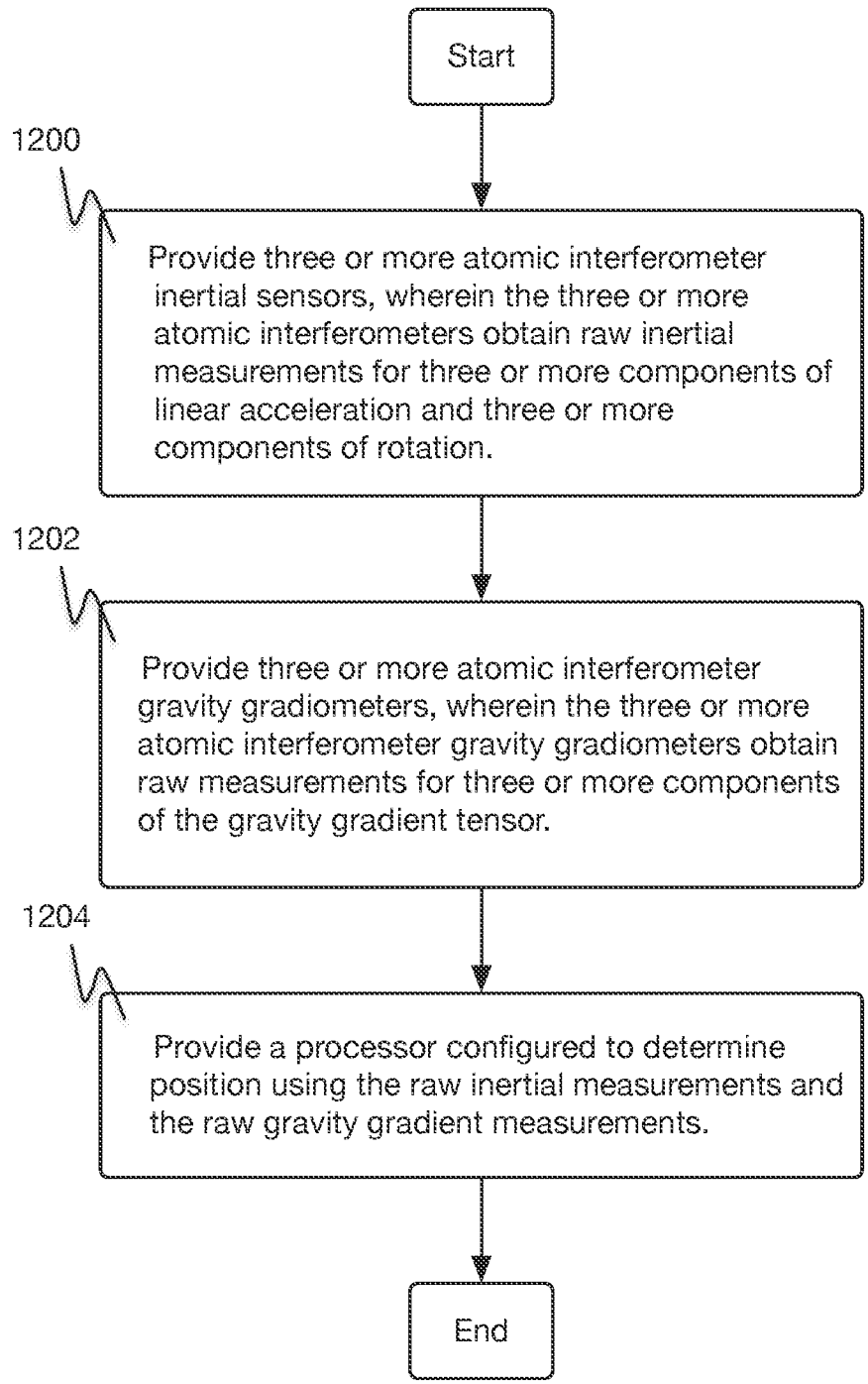
FIG. 12 is a flow diagram illustrating an embodiment of a process for determining a precise position using an inertial navigation system design for precision mobile reference platforms.

FIG. 12 is a flow diagram illustrating an embodiment of a process for determining a precise position using an inertial navigation system design for precision mobile reference platforms. In some embodiments, the process of FIG. 12 is executed using inertial navigation system 100 of FIG. 1. In the example shown, in 1200, three or more atomic interferometer inertial sensors, wherein the three or more atomic interferometers obtain raw inertial measurements for three or more components of linear acceleration and three or more components of rotation is provided. In 1202, three or more atomic interferometer gravity gradiometers, wherein the three or more atomic interferometer gravity gradiometers obtain raw gravity measurements for three or more components of the gravity gradient tensor is provided. In 1204, a processor configured to determine position using the raw inertial measurements and the raw gravity gradient measurements is provided.

Figure 13:
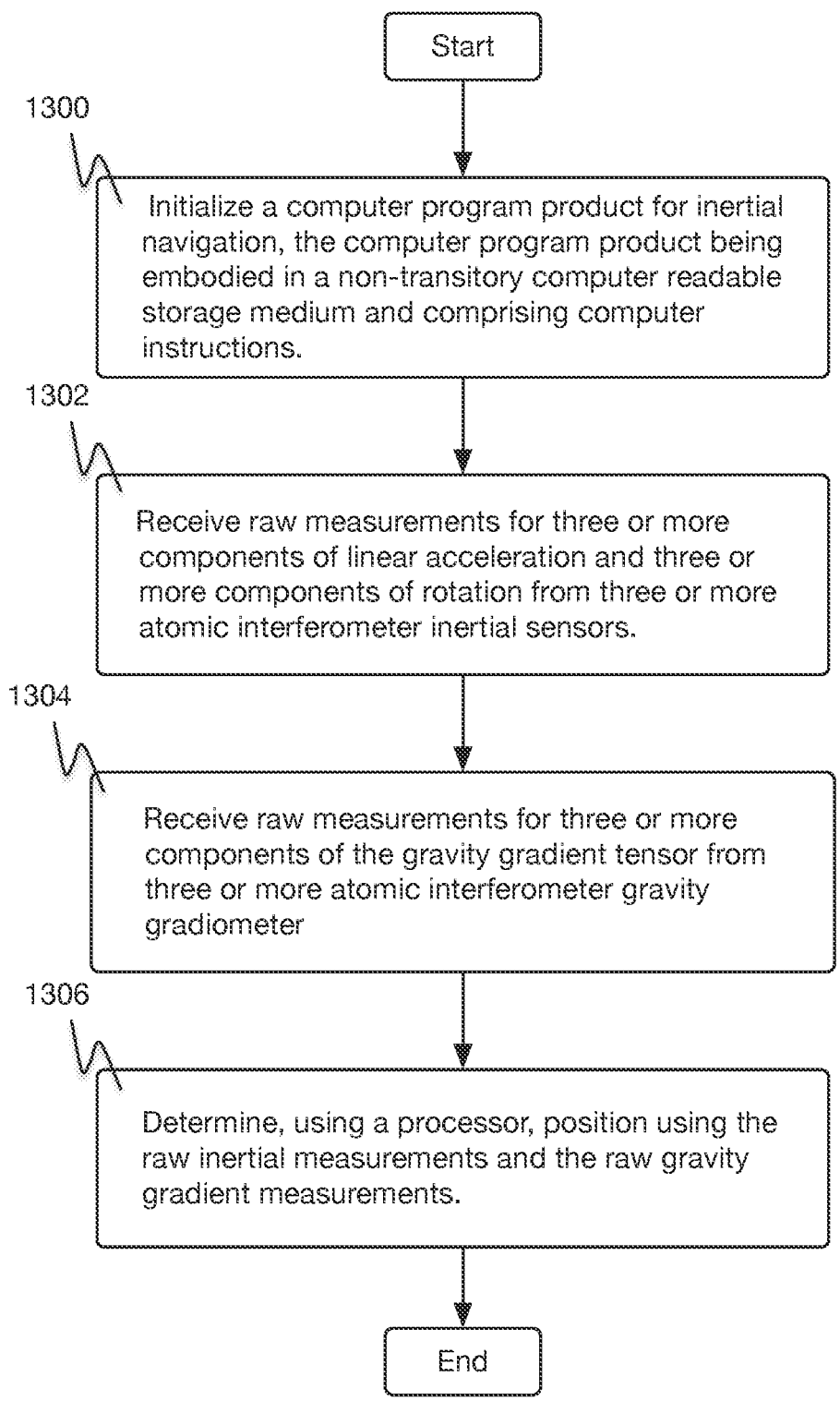
FIG. 13 is a flow diagram illustrating an embodiment of a computer program product for determining a precise position using an inertial navigation system design for precision mobile reference platforms.

FIG. 13 is a flow diagram illustrating an embodiment of a computer program product for determining a precise position using an inertial navigation system design for precision mobile reference platforms. In some embodiments, the process of FIG. 13 is executed using inertial navigation system 100 of FIG. 1. In the example shown, in 1300, a computer program product for inertial navigation, the computer program product being embodied in a non-transitory computer readable storage medium and comprising computer instructions is initialized. In 1302, raw measurements of inertial quantities for three or more components of linear acceleration and three or more components of rotation from three or more atomic interferometer inertial sensors are received. In 1304, raw measurements of three or more components of the gravity gradient tensor from three or more atomic interferometer gravity gradiometer are received. In 1306, position using the raw inertial measurements and the raw gravity gradient measurements is determined using a processor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device comprising:
   three or more atomic interferometer inertial sensors obtaining raw inertial measurements for three or more components of linear acceleration and three or more components of rotation for determining motion in three orthogonal directions x, y, and z and rotation about x, y, and z axes, wherein each of the three or more atomic interferometer inertial sensors measures rotation about a single axis and acceleration along the single axis based at least in part on counter-propagating beams of atoms as a source, wherein the three or more atomic interferometer inertial sensors are mounted at a different height from the three or more atomic interferometer gravity gradiometers;
   three or more atomic interferometer gravity gradiometers for obtaining raw gravity gradient measurements for three or more components of a gravity gradient tensor;
   a base, wherein the three or more atomic interferometer inertial sensors are mounted on the base, wherein the three or more atomic interferometer gravity gradiometers are mounted on the base; and
   a processor configured to determine position and rotation using the raw inertial measurements and the raw gravity gradient measurements.

2. The device of claim 1, wherein an atomic interferometer gravity gradiometer of the three of more atomic interferometer gravity gradiometers includes a vacuum cell, wherein the vacuum cell houses an atom trap based on laser cooling for producing an ensemble of laser-cooled atoms.

3. The device of claim 2, wherein the vacuum cell includes optics to route interrogation beams within the vacuum cell between two atom ensembles via two beam tubes connecting the two cells containing the two atom ensembles.

4. The device of claim 1, wherein atomic interferometer gravity gradient measurements of Txx, Txy, and Tyy are determined using three coplanar inline measurements.

5. The device of claim 4, wherein each of the three coplanar inline measurements have a sense axis at an angle of 60 degrees relative to another sense axis.

6. The device of claim 4, wherein each of the atomic interferometer gravity gradiometers includes pairs of atom clouds separated by a distance L measured along a shared interferometer interrogation beam along its sense axis.

7. The device of claim 1, wherein each of the three or more atomic interferometer inertial sensors are arranged with coplanar atomic beam directions and a 60-degree angle separating any two beams of atoms.

8. The device of claim 7, wherein each of the three or more atomic interferometer inertial sensors is on a motorized mount that can be used to rotate it about an axis of the atomic beams for calibration and to reduce bias drift by reversing a sense axis.

9. The device of claim 1, wherein the three or more atomic interferometer inertial sensors are aligned with three equivalent symmetry planes of an extruded hexagon in which each symmetry plane of the three equivalent symmetry planes is at a 60-degree angle relative to an other symmetry plane of the three equivalent symmetry planes and is arranged symmetrically with respect to a symmetry axis of the extruded hexagon.

10. The device of claim 1, wherein the three or more atomic interferometer inertial sensors are aligned with three symmetry planes bisecting six equal sides of an extruded hexagon, and wherein the three or more atomic interferometer gravity gradiometers are aligned along three alternate symmetry planes that intersect vertices of a hexagon.

11. The device of claim 1, wherein the three or more atomic interferometer inertial sensors are coplanar with a first plane and aligned along a first set of three distinct direction vectors, and wherein the three or more atomic interferometer gravity gradiometers are coplanar with a second plane parallel to the first plane with inline gradient sense axes aligned along a second set of three distinct direction vectors.

12. The device of claim 1, wherein each inertial sensor comprises a point-source atom interferometer, which can simultaneously provide gyroscope and acceleration outputs.

13. The device of claim 1, wherein the three or more atomic interferometer gravity gradiometers are aligned with three equivalent symmetry planes of an extruded hexagon in which each symmetry plane of the three equivalent symmetry planes is at a 60-degree angle relative to an other symmetry plane of the three equivalent symmetry planes and is arranged symmetrically with respect to a symmetry axis of the extruded hexagon.

14. The device of claim 1, wherein the three or more atomic interferometer gravity gradiometers are aligned with three symmetry planes bisecting six equal sides of an extruded hexagon, and wherein three or more atomic interferometer inertial sensors are aligned along three alternate symmetry planes that intersect vertices of the extruded hexagon.

15. The device of claim 1, wherein the processor is further configured to calibrate the device by taking measurements for calibration while the device has a trajectory that is a closed figure that intersects an initial calibration point within accumulated position errors and retraces a previous path, thereby minimizing build-up of errors due to gravitational uncertainty.

16. The device of claim 15, wherein the closed figure comprises a circle or figure-eight.

17. The device of claim 1, wherein the processor is further configured to minimize position error based on a covariance analysis of their errors.

18. A method comprising:
   obtaining raw inertial measurements for three or more components of linear acceleration and three or more components of rotation for determining motion in three orthogonal directions x, y, and z and rotation about x, y, and z axes using three or more atomic interferometer inertial sensors, wherein each of the three or more atomic interferometer inertial sensors measures rotation about a single axis and acceleration along the single axis based at least in part on counter-propagating beams of atoms as a source, wherein the three or more atomic interferometer inertial sensors are mounted at a different height from the three or more atomic interferometer gravity gradiometers;
   obtaining raw gravity gradient measurements for three or more components of a gravity gradient tensor using three or more atomic interferometer gravity gradiometers, wherein the three or more atomic interferometer inertial sensors are mounted on the base, and wherein the three or more atomic interferometer gravity gradiometers are mounted on the base; and
   determining, using a processor, position and rotation using the raw inertial measurements and the raw gravity gradient measurements.

19. A method comprising:
   providing three or more atomic interferometer inertial sensors, wherein the three or more atomic interferometers obtain raw inertial measurements for three or more components of linear acceleration and three or more components of rotation for determining motion in three orthogonal directions x, y, and z and rotation about x, y, and z axes, wherein each of the three or more atomic interferometer inertial sensors measures rotation about a single axis and acceleration along the single axis based at least in part on counter-propagating beams of atoms as a source, wherein the three or more atomic interferometer inertial sensors are mounted at a different height from the three or more atomic interferometer gravity gradiometers;
   providing three or more atomic interferometer gravity gradiometers, wherein the three or more atomic interferometer gravity gradiometers obtain raw gravity gradient measurements for three or more components of a gravity gradient tensor, wherein the three or more atomic interferometer inertial sensors are mounted on the base, wherein the three or more atomic interferometer gravity gradiometers are mounted on the base; and
   providing a processor configured to determine position and rotation using the raw inertial measurements and the raw gravity gradient measurements.

20. A computer program product, the computer program product being embodied in a non-transitory computer readable storage medium and comprising computer instructions for:
   receiving raw inertial measurements for three or more components of linear acceleration and three or more components of rotation from three or more atomic interferometer inertial sensors for determining motion in three orthogonal directions x, y, and z and rotation about x, y, and z axes, wherein each of the three or more atomic interferometer inertial sensors measures rotation about a single axis and acceleration along the single axis based at least in part on counter-propagating beams of atoms as a source, wherein the three or more atomic interferometer inertial sensors are mounted at a different height from the three or more atomic interferometer gravity gradiometers;

receiving raw gravity gradient measurements for three or more components of a gravity gradient tensor from three or more atomic interferometer gravity gradiometers, wherein the three or more atomic interferometer inertial sensors are mounted on the base, wherein the three or more atomic interferometer gravity gradiometers are mounted on the base; and determining, using a processor, position and rotation using the raw inertial measurements and the raw gravity gradient measurements.

* * * * *